No. 841,925. PATENTED JAN. 22, 1907.
E. W. BROOMALL.
CENTRIFUGAL SEPARATOR.
APPLICATION FILED NOV. 4, 1905.

WITNESSES:

INVENTOR:

UNITED STATES PATENT OFFICE.

EDGAR W. BROOMALL, OF ROCHESTER, NEW YORK.

CENTRIFUGAL SEPARATOR.

No. 841,925.  Specification of Letters Patent.  Patented Jan. 22, 1907.

Application filed November 4, 1905. Serial No. 285,924.

*To all whom it may concern:*

Be it known that I, EDGAR W. BROOMALL, a citizen of the United States, and a resident of Rochester, in the county of Monroe and State of New York, have invented certain new and useful Improvements in Centrifugal Separators, of which the following is a specification.

This invention relates to centrifugal separators, and has for its object to provide a simple, compact, and efficient device that can be cheaply and easily constructed and that can be taken apart to be cleaned.

Figure 1:
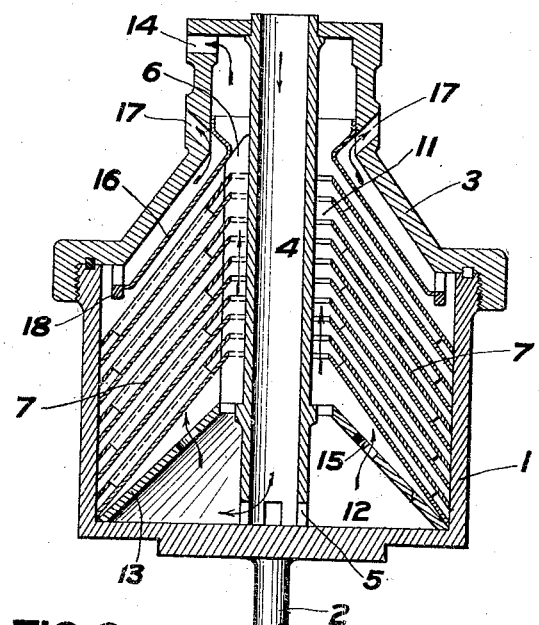
Figure 2:
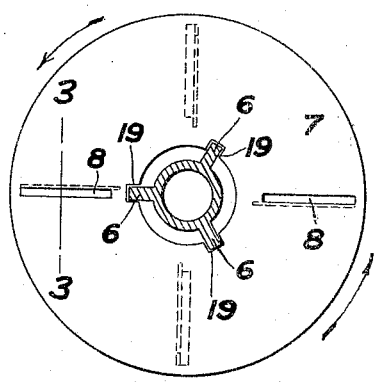
Figure 3:
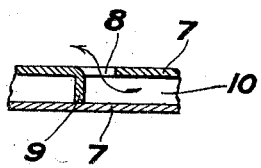

In the drawings, Figure 1 is a central vertical section. Fig. 2 is a plan view of one of the separator-blades, and Fig. 3 is a section on the line 3 3 of Fig. 2.

The separator is inclosed in a bowl or case 1, that revolves on a shaft 2. A cover 3 gives access to it. A central tube 4 conducts the fresh milk into the bottom of the bowl through openings 5. A number of ribs or wings 6 are found on the tube that extend along it longitudinally.

The separating means comprise a number of plates 7, each having the form of a truncated cone that nest within the bowl one above the other. A number of radial slots 8 are cut in each of these plates, and tongues 9 are turned down therefrom, as shown in Fig. 3. These tongues keep each plate out of contact with the one next below it, thus leaving an annular space 10 between adjacent plates. The plates may be stamped from a single piece of metal and the tongues formed by bending down the strip of metal that is removed to form the slots 8. Two slots are shown in each plate, and these are so placed with reference to the plate next above and below it that they lie midway between the slots in the other plates. (See Fig. 2.) The central openings of the plates are larger than the central tube 4, so that there is a vertical annular passage 11 through the bowl along the tube 4, as indicated by the arrow in Fig. 1.

The operation of the separator is as follows: The fresh milk that is to be acted upon is introduced into the separator through the tube 4, from which it flows through the perforations 5 out into the chamber 12. In this chamber it is subjected to the centrifugal action of the separator whirling in the direction of the arrow in Fig. 2, and some of the cream flows back along the under side of the partition 13 to the outside of the tube 4, (which serves as the cream-wall,) and thence follows the course of the arrow in Fig. 1 up through the passage 11 to the outlet 14. The main body of the milk passes through the perforations 15 to the separator-plates 7. In the first space 10 between the plate 13 and the lowest plate 7 most of the cream is separated from the milk, passing inwardly along the under side of this plate 7 to the cream-wall. Thence the milk passes upwardly through the slots 8 into the space 10 next above, to be there again spread out, and here more cream is separated from it. Each flange 9 intercepts the milk as it is thrown outwardly and directs it upwardly into the space 10 next above, so the milk is conducted up through the separator in a tortuous course and is spread out repeatedly in the succession spaces 10. The blue milk is finally discharged through the passage formed between the top plate 16 and the cover 3, which leads to the outlets 17. The upper plate 16 engages the cover 3 above the outlets 17, so that the blue milk cannot become mixed with the cream that passes up along the cream-wall to the outlet 14 and at its lower end is attached to a flange 18 on the cover 3. The plates are recessed at 19 to receive the ribs 6 on the tube 4 and are thereby locked to the tube 4 and caused to revolve with the bowl. When the cover 3 is removed, the blades 7 can be removed readily from the bowl to be cleaned by withdrawing them from the tube 4.

What I claim is—

A centrifugal separator comprising, a rotary bowl having outlets for the cream and blue milk respectively, a central vertical tube within the bowl and having apertures in its lower end opening into the bowl and provided thereabove with integral longitudinal ribs, a conical partition in the bottom of the bowl provided with apertures and having a central opening of greater diameter than the said tube, a series of spaced conical separator-plates above the partition, having their central openings of greater diameter than the tube and notched to receive its flanges; the said plates having radial slots in staggered relation to each other to form a tortuous passage through the series, and spacing-tongues alongside the said slots, substantially as described.

EDGAR W. BROOMALL.

Witnesses:
D. GURNEE,
L. THON.